US010607382B2

(12) United States Patent
Anderson (10) Patent No.: US 10,607,382 B2
(45) Date of Patent: Mar. 31, 2020

(54) ADAPTING CONTENT TO AUGUMENTED REALITY VIRTUAL OBJECTS

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 74 days.

(21) Appl. No.: 15/385,243

(22) Filed: Dec. 20, 2016

(65) Prior Publication Data

US 2017/0161931 A1 Jun. 8, 2017

Related U.S. Application Data

(63) Continuation of application No. 14/361,215, filed as application No. PCT/US2013/069618 on Nov. 12, 2013, now Pat. No. 9,524,587.

(51) Int. Cl.
*G06T 11/60* (2006.01)
*G06F 21/31* (2013.01)
*G06F 21/10* (2013.01)
*G06T 19/00* (2011.01)

(52) U.S. Cl.
CPC .............. *G06T 11/60* (2013.01); *G06F 21/10* (2013.01); *G06F 21/31* (2013.01); *G06T 19/006* (2013.01)

(58) Field of Classification Search
None
See application file for complete search history.

(56) References Cited

U.S. PATENT DOCUMENTS

| 2009/0293012 | A1* | 11/2009 | Alter ...................... G01C 21/20 715/810 |
| 2013/0024774 | A1* | 1/2013 | Basso ................. H04L 65/1016 715/733 |
| 2014/0375688 | A1* | 12/2014 | Redmann .............. G06T 19/006 345/633 |

* cited by examiner

*Primary Examiner* — Edward Martello
(74) *Attorney, Agent, or Firm* — Barnes & Thornburg LLP (57) ABSTRACT

Technologies for adapting content to augmented reality virtual objects include a content consumption device to render selected content and a mobile computing device to render a virtual object within the physical environment of the mobile computing device. The mobile computing device may transfer the virtual object to the content consumption device. The content consumption device may adapt the content based on the transferred virtual object, and render the adapted content. The adapted content may be selected from a number of pre-defined scenes, or may be generated to include the virtual object. The adapted content may include other characters or objects that react to the transferred virtual object. The virtual object may be transferred back to the mobile computing device with updated attributes. The content may be streamed from a content source over a network. Other embodiments are described and claimed.

22 Claims, 4 Drawing Sheets

ADAPTING CONTENT TO AUGMENTED REALITY VIRTUAL OBJECTS

CROSS REFERENCE TO RELATED APPLICATIONS

This application is a continuation application of U.S. patent application Ser. No. 14/361,215, entitled "ADAPTING CONTENT TO AUGUMENTED REALITY VIRTUAL OBJECTS," now U.S. Pat. No. 9,524,587, which was filed on May 28, 2014, and which is a national stage entry under 35 U.S.C. § 371(b) of International Application No. PCT/US2013/069618, which was filed Nov. 12, 2013.

BACKGROUND

Augmented reality systems project virtual characters and objects into physical locations, allowing for immersive experiences and novel interaction models. Typically, an augmented reality device calculates a position of a virtual object while capturing video images of the device environment (e.g., the environment of a room in which the user of the augmented reality device is currently located). When the position associated with the virtual object is visible in the captured images, the augmented reality device may render the virtual character, for example by overlaying the environment video with a two- or three-dimensional animated rendering of the virtual character. Virtual characters may interact with real objects in the physical environment, for example, by moving toward physical markers bearing visible coding.

Content consumption devices such as digital televisions typically play media content from a local source such as a DVD or stream content from a remote content server. Such content is typically static and not interactive—that is, a typical movie or television show plays straight through, the same every time. Additionally, typical media content is limited to one screen, such as the main television monitor.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
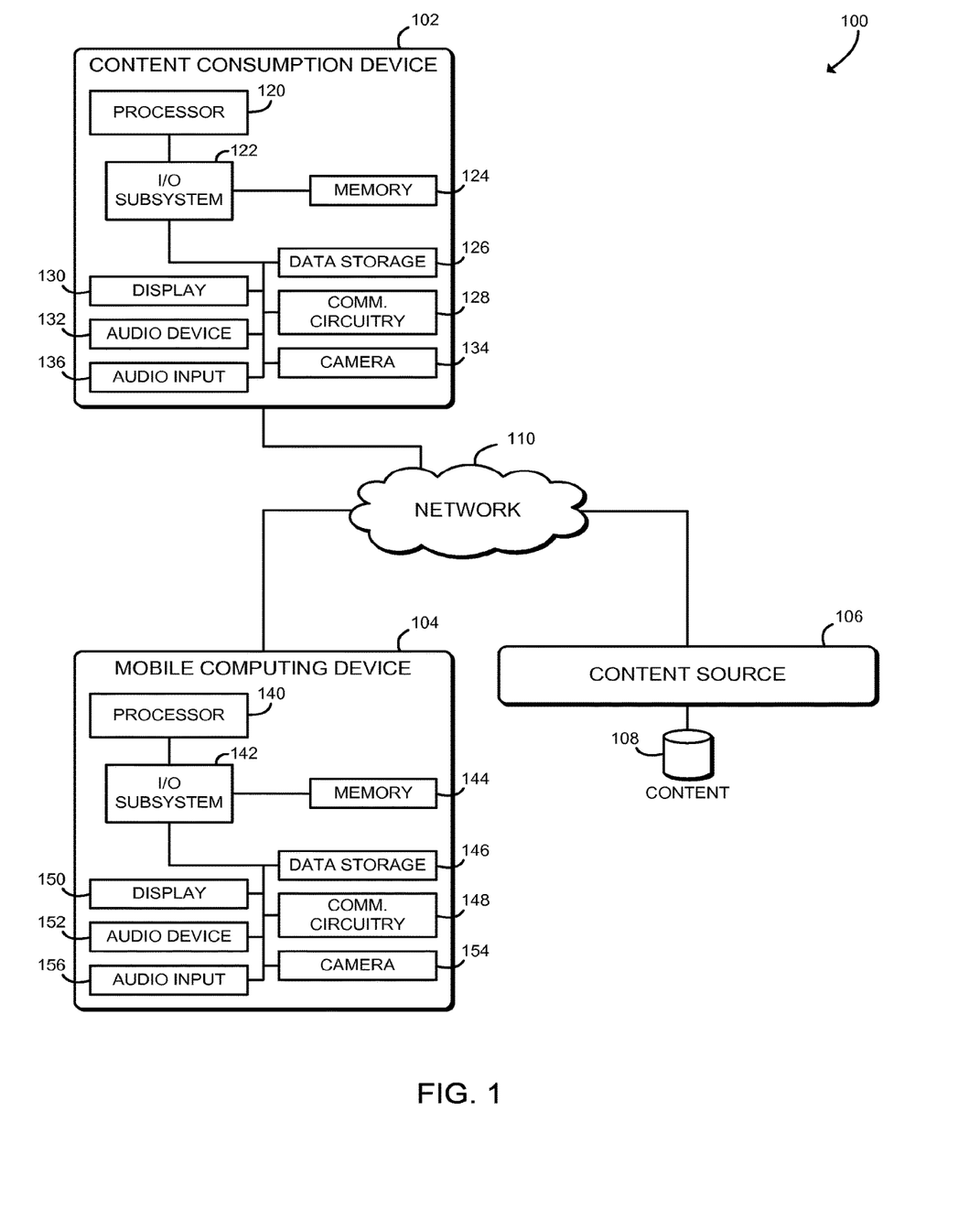
FIG. 1 is a simplified block diagram of at least one embodiment of a system for adapting content to augmented reality virtual objects.

Referring now to FIG. 1, in the illustrative embodiment, a system 100 for adapting content to augmented reality virtual objects includes a content consumption device 102, a mobile computing device 104, and a content source 106, which may be in communication with each other over a network 110. In use, as discussed in more detail below, the content consumption device 102 renders content 108 for presentation to a user. The content 108 may be embodied as any digital media content that may be presented to the user, including, without limitation, video content, audio content, textual content, animation content, and/or game content. As the content consumption device 102 renders the content 108, the mobile computing device 104 establishes one or more augmented reality virtual objects. It should be understood that a virtual object may be a virtual character, a virtual artifact, virtual equipment, or other virtual objects that may be rendered by the mobile computing device 104 in an augmented reality application. The virtual object established by the mobile computing device 104 may be transferred to the content consumption device 102. Upon being transferred a virtual object, the content consumption device 102 adapts the content 108 based on the transferred virtual object, for example by incorporating the virtual object into the rendered content 108, adapting actions of characters or other objects of the rendered content 108 to the presence or actions of the transferred virtual object, and/or modifying the content scenes or storyline in response to the transferred virtual object as discussed in more detail below. By adapting the content 108 to a virtual object introduced from the mobile computing device 104, the interactivity and immersiveness of the content 108 may be increased. Such improvements to the content 108 may also improve the value of the content 108 to the user.

The content consumption device 102 may be embodied as any type of device on which a user may consume content and capable of performing the functions described herein, including, without limitation, a digital television, a desktop computer, a gaming console, a smart appliance, a set-top box, a smartphone, a cellular telephone, a handset, a computer, a tablet computer, a laptop computer, a notebook computer, a messaging device, a vehicle telematics device, a network appliance, a web appliance, a distributed computing system, a multiprocessor system, a processor-based system, and/or a consumer electronic device. As shown in FIG. 1, the content consumption device 102 includes a processor 120, an input/output subsystem 122, a memory 124, a data storage device 126, and communication circuitry 128. Of course, the content consumption device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the content consumption device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the content consumption device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the content consumption device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may permanently or temporarily store the content 108 consumed by the content consumption device 102, as well as information related to virtual objects rendered in connection with the content 108.

The communication circuitry 128 of the content consumption device 102 may be embodied as any communication circuit, device, or collection thereof, capable of enabling communications between the content consumption device 102, the mobile computing device 104, the content source 106, and/or other remote devices over the network 110. The communication circuitry 128 may be configured to use any one or more communication technology (e.g., wireless or wired communications) and associated protocols (e.g., 3G, LTE, Bluetooth®, Wi-Fi®, WiMAX, etc.) to effect such communication.

In the illustrative embodiment, the content consumption device 102 further includes a display 130 and an audio device 132. The display 130 of the content consumption device 102 may be embodied as any type of display capable of displaying digital information such as a liquid crystal display (LCD), a light emitting diode (LED), a plasma display, a cathode ray tube (CRT), or other type of display device. In some embodiments, the display 130 may be coupled to a touch screen to allow user interaction with the content consumption device 102. The audio device 132 may be embodied as any device capable of generating audio signals for output, such as a paper cone speaker, an audio transducer, an audio output jack, a digital-to-analog converter (DAC), or other type of audio device.

The illustrative content consumption device 102 further includes a camera 134 and an audio input 136 in some embodiments. The camera 134 may be embodied as a digital camera or other digital imaging device integrated with the content consumption device 102 or otherwise communicatively coupled thereto. The camera 134 includes an electronic image sensor, such as an active-pixel sensor (APS), e.g., a complementary metal-oxide-semiconductor (CMOS) sensor, or a charge-coupled device (CCD). The camera 134 may be used to capture images of the environment of the content consumption device 102 including, in some embodiments, capturing motion gestures performed by the user of the content consumption device 102. The audio input 136 may be embodied as any sensor capable of capturing audio signals such as a microphone, a line input jack and associated circuitry, an analog-to-digital converter (ADC), or other type of audio sensor.

The mobile computing device 104 is configured to manage one or more virtual objects and to transfer the virtual objects to or from the content consumption device 102. The mobile computing device 104 may be embodied as any kind of mobile computing device capable of performing the functions described herein including, without limitation, a smartphone, a cellular telephone, a handset, a computer, a tablet computer, a laptop computer, a notebook computer, a messaging device, a network appliance, a web appliance, a distributed computing system, a multiprocessor system, a processor-based system, and/or a consumer electronic device. Illustratively, the mobile computing device 104 includes a processor 140, an I/O subsystem 142, a memory 144, a data storage device 146, communication circuitry 148, a display 150, an audio device 152, a camera 154, an audio input 156, and/or other components and devices commonly found in a smartphone or similar computing device. Those individual components of the mobile computing device 104 may be similar to the corresponding components of the content consumption device 102, the description of which is applicable to the corresponding components of the mobile computing device 104 and is not repeated herein so as not to obscure the present disclosure.

The content source 106 is configured to provide access across the network 110 to the content 108. For example, the content source 106 may stream video content, audio content, animation content, game content, or other content to the content consumption device 102. In some embodiments, the content source 106 may also authenticate the user of the content consumption device 102. The content source 106 may be embodied as any type of server computing device, or collection of devices, capable of performing the functions described herein. As such, the content source 106 may be embodied as a single server computing device or a collection of servers and associated devices. For example, in some embodiments, the content source 106 may be embodied as a "virtual server" formed from multiple computing devices distributed across the network 110 and operating in a public or private cloud. Accordingly, although the content source 106 is illustrated in FIG. 1 as embodied as a single server computing device, it should be appreciated that the content source 106 may be embodied as multiple devices cooperating together to facilitate the functionality described below. Further, the content source 106 may include components and features similar to the content consumption device 102 and/or typical data servers such as a processor, I/O subsystem, memory, data storage, communication circuitry, and various peripheral devices, which are not illustrated in FIG. 1 for clarity of the present description. Of course, in some embodiments the content consumption device 102 may access content 108 from a number of different content sources 106 (not shown).

The content 108 may be embodied as any network-accessible data storage, including without limitation as a database, a file server, network attached storage, or storage area network. The content 108 is adaptable, and may include alternate content for various combinations of virtual characters, objects, and actions. For example, the content 108 may include a number of pre-defined scenes or storylines including different combinations of virtual characters. The content 108 is illustrated as networked data accessible by the content source 106; however, in other embodiments the content 108 may be in any location accessible to the content consumption device 102, including in local storage or a local file server.

As discussed in more detail below, the content consumption device 102, the mobile computing device 104, and the content source 106 may be configured to transmit and receive data with each other and/or other remote devices over the network 110. The network 110 may be embodied as any number of various wired and/or wireless networks. For example, the network 110 may be embodied as, or otherwise include, a wired or wireless local area network (LAN), a wired or wireless wide area network (WAN), a cellular network, and/or a publicly-accessible, global network such as the Internet. As such, the network 110 may include any number of additional devices, such as additional computers, routers, and switches, to facilitate communications among the devices of the system 100.

Figure 2:
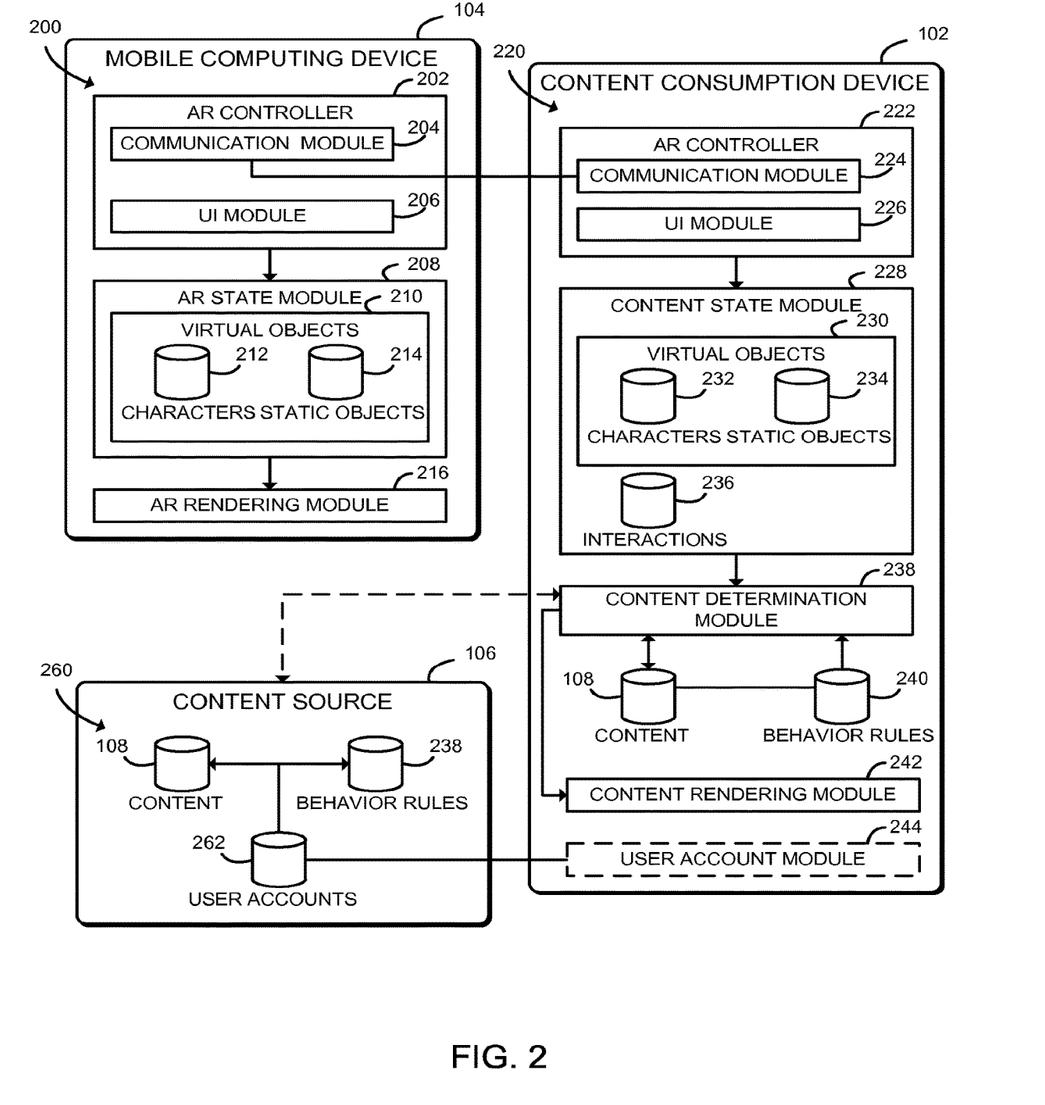
FIG. 2 is a simplified block diagram of at least one embodiment of various environments that may be established by the system of FIG. 1.

Referring now to FIG. 2, in the illustrative embodiment, the mobile computing device 104 establishes an environment 200 during operation. The illustrative environment 200 includes an augmented reality controller 202, an augmented reality state module 208, and an augmented reality rendering module 216. The various modules of the environment 200 may be embodied as hardware, firmware, software, or a combination thereof.

The augmented reality state module 208 is configured to record and simulate a number of virtual objects 210 that may be rendered by the augmented reality rendering module 216. The virtual objects 210 may include virtual characters 212, static virtual objects 214, and any other virtual objects that may be rendered by the mobile computing device 104. The augmented reality state module 208 may store and update various attributes of the virtual objects 210 including position, appearance, current action, abilities, characteristics, or any other attribute. The augmented reality state module 208 may simulate or otherwise model the position and/or behavior of the virtual objects 210.

The augmented reality rendering module 216 is configured to render one or more virtual objects 210 in the environment of the mobile computing device 104. For example, the augmented reality rendering module 216 may capture video of the device environment using the camera 154 and then render virtual objects 210 as two- or three-dimensional animated overlays on the captured video content.

The augmented reality controller 202 is configured to manage the virtual objects 210. The augmented reality controller 202 may command the augmented reality state module 208 to add or remove virtual objects 210, or to initiate actions of the virtual objects 210. The augmented reality controller 202 is also configured to transfer virtual objects 210 to and from the content consumption device 102 as discussed in more detail below. The augmented reality controller 202 may transfer virtual objects 210 based on attributes such as position, or in response to user interface commands such as touch commands or input gestures. In some embodiments, those functions may be performed by sub-modules, for example by a communication module 204 or by a user interface module 206.

Still referring to FIG. 2, in the illustrative embodiment, the content consumption device 102 establishes an environment 220 during operation. The illustrative environment 220 includes an augmented reality controller 222, a content state module 228, a content determination module 238, and a content rendering module 242. Additionally, in some embodiments, the environment 220 may include a user account module 244. The various modules of the environment 220 may be embodied as hardware, firmware, software, or a combination thereof.

The content state module 228 is configured to record and model any state associated with the content 108. The content state may include any data describing the state of the content 108 including, without limitation, the state of virtual objects 230 such as virtual characters 232, static virtual objects 234, predefined characters, attributes of characters or objects, or actions or behaviors of characters and objects. The content state may also include storyline progression, scene selection, and/or any other data useful in describing the state of the content 108. For example, the content state module 228 may be configured to record the number, identity, and attributes of any virtual characters 232 and/or virtual objects 234 appearing in or interacting with the content 108. Recorded attributes may include position, appearance, current action, or any other attribute. The content state module 228 may be further configured to store user and/or character interactions 236 with the content 108 over time, allowing the content 108 to adapt to prior behavior of the user and/or virtual characters 232. The interactions 236 may record prior behaviors and activities of the virtual characters 232 and/or virtual objects 234, as well as prior user commands In some embodiments, the content state module 228 may also be configured to model the behavior of the virtual characters 232 or virtual objects 234, for example through motion tracking, physics modeling, artificial intelligence, and/or behavior modeling.

The augmented reality controller 222 is configured to manage the virtual objects 230 and interactions 236. The augmented reality controller 222 may command the content state module 228 to add or remove virtual characters 232 and/or virtual objects 234, or to initiate interactions 236. The augmented reality controller 222 is also configured to transfer virtual objects 230 to and from the mobile computing device 104. The augmented reality controller 222 may transfer the virtual objects 230 based on attributes such as position, or in response to user interface commands such as motion gestures. In some embodiments, those functions may be performed by sub-modules, for example by a communication module 224 or by a user interface module 226.

The content determination module 238 is configured to adapt the content 108 based on the current content state as maintained by the content state module 228. The content 108 may include a number of alternate scenes or actions for different combinations of virtual characters 232, virtual objects 234, and/or interactions 236. The content determination module 238 may adapt the content 108 by applying one or more behavior rules 240, which define how the content 108 adapts to aspects of the content state. For example, the behavior rules 240 may define alternate scenes or storylines from the content 108 based on the virtual characters 232 present in the content state. In some embodiments, the behavior rules 240 may define individual actions performed by the virtual characters 232 and/or virtual objects 234 based on the current content state. As described below, in addition to being established in the environment 220 of the content consumption device 102, in some embodiments the behavior rules 240 may be established by the content source 106.

The content rendering module 242 is configured to render the content 108 adapted by the content determination module 238 for presentation to the user. As described above, the rendered content 108 may include video content, audio content, textual content, animation content, game content, or any other media content. The rendered content 108 may include the virtual characters 232, virtual objects 234, and/or interactions 236 managed by the content state module 228. The content 108 may be streamed from the content source 106, or in some embodiments stored locally on the content consumption device 102.

The user account module 244, in some embodiments, may be configured to authenticate the user to access a user account 262 maintained by the content source 106. The user account 262 may be associated with some or all of the content 108 and/or the behavior rules 240. The user accounts 262 may control access to the content 108 and/or the behavior rules 240; that is, the content consumption device 102 may access only the content 108 and/or the behavior rules 240 that are associated with the current user account 262.

Still referring to FIG. 2, in the illustrative embodiment the content source 106 establishes an environment 260 during operation. The illustrative environment 260 includes the content 108, the behavior rules 240, and the user accounts 262. As described above, the content consumption device 102 may stream or otherwise access the content 108 and/or the behavior rules 240 via the content source 106. Additionally, the user accounts 262 may be associated with and control access to some or all of the content 108 and/or behavior rules 240. The various modules of the environment 260 may be embodied as hardware, firmware, software, or a combination thereof.

Figure 3:
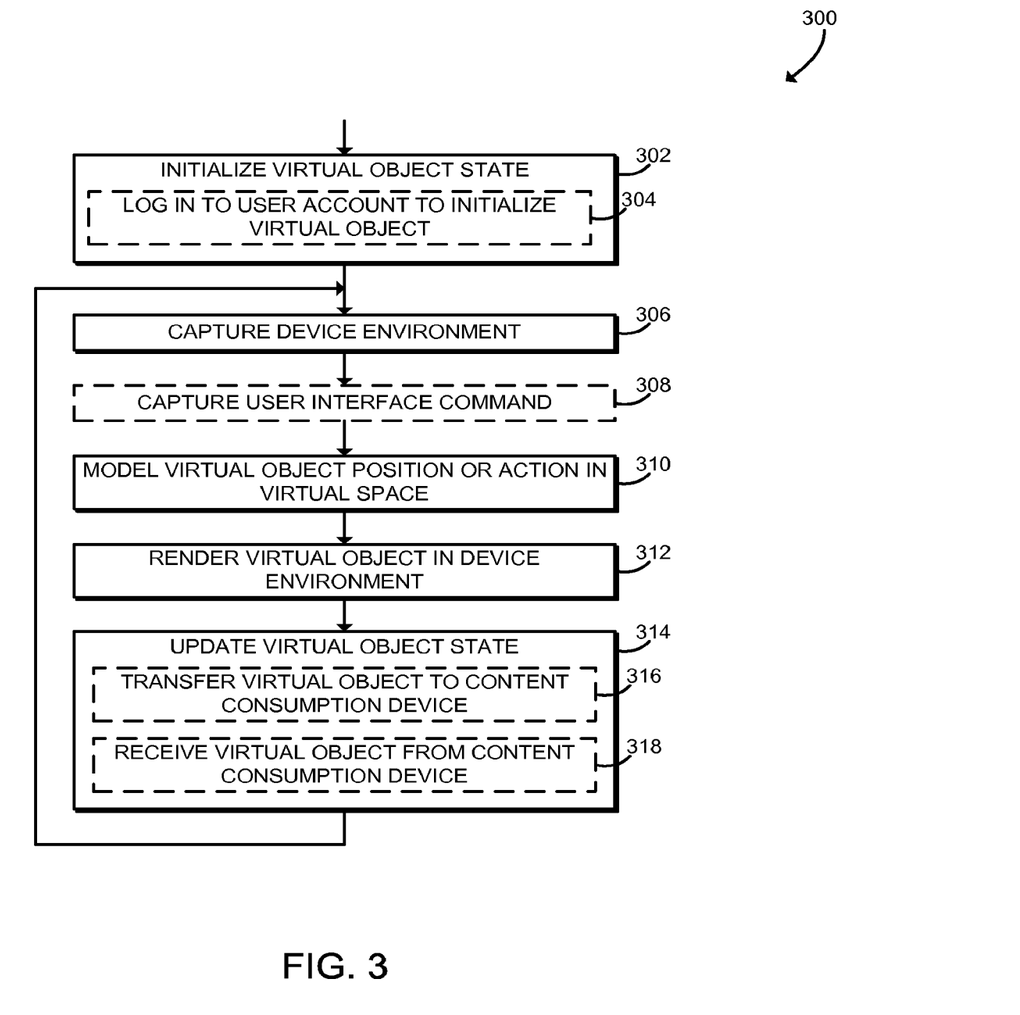
FIG. 3 is a simplified flow diagram of at least one embodiment of a method for rendering augmented reality virtual objects that may be executed by a mobile computing device of the system of FIGS. 1 and 2.

Referring now to FIG. 3, in use, the mobile computing device 104 may execute a method 300 for rendering augmented reality virtual objects. The method 300 begins with block 302, in which the mobile computing device 104 initializes the state of the virtual objects 210. To initialize a virtual character 212 or a virtual object 214, the mobile computing device 104 may select the particular virtual character 212 or virtual object 214 and initialize any attributes of the selected virtual character 212 or virtual object 214. In some embodiments, the mobile computing device 104 may initialize a character model or simulation, for example defining an initial position and action of the virtual character 212 or virtual object 214. In some embodiments, in block 304 the mobile computing device 104 may log in to a user account to initialize the virtual character 212 or virtual object 214. To log in to the user account, the mobile computing device 104 may authenticate the user of the mobile computing device 104 locally, or may contact the content source 106 to authenticate the user and thereby log in to the user account. Logging in to the user account may allow the mobile computing device 104 to access particular virtual characters 212 or virtual objects 214 that have been associated with that user account, as well as any attributes that have been associated with that user account. For example, the user account may record virtual objects 210 and/or attributes that have been previously purchased or unlocked by the user.

In block 306, the mobile computing device 104 captures the local environment of the mobile computing device 104. In many embodiments, the mobile computing device 104 may capture an image or a video stream of the device environment using the camera 154. In some embodiments, the mobile computing device 104 may also determine its physical position and/or orientation in the local environment. In other embodiments, the mobile computing device 104 may determine other aspects of the device environment related to rendering augmented reality content, such as the dimensions of the current room, the acoustic properties of the device environment, or other aspects.

In block 308, in some embodiments the mobile computing device 104 may capture a user interface command related to the virtual objects 210. For example, the user interface command may command the mobile computing device 104 to move a virtual object 210, activate an action of a virtual object 210, or otherwise manage a virtual object 210. The user interface command may be captured using any input modality supported by the mobile computing device 104. For example, the user may select a user interface control on the display 150, perform a motion gesture recognized by a touch screen of the display 150 and/or the camera 154, utter a spoken command detected by the audio input 156, perform a movement of the mobile computing device 104 captured by one or more motion sensors of the mobile computing device 104, or perform any other input action.

In block 310, the mobile computing device 104 models the position or action of the virtual objects 210 in physical space. The mobile computing device 104 may determine the coordinates of the virtual objects 210 in virtual space, and translate the virtual coordinates to a corresponding physical position in the physical environment of the mobile computing device 104. Similarly, the mobile computing device 104 may model the orientation, configuration, appearance, or other attributes of the virtual objects 210. The mobile computing device 104 may perform any form of modeling. For example, the mobile computing device 104 may replay predefined scenes or animations to determine the position and/or actions of a virtual character 212. In some embodiments, the mobile computing device 104 may simulate, track, or otherwise model the motion of the virtual character 212 in space, for example using a physics engine. As an example, consider that the virtual character 212 is a virtual pet such as a salamander. The mobile computing device 104 may simulate the virtual salamander's activities (e.g., crawling, basking) and determine a position in the device environment for the virtual salamander.

In block 312, the mobile computing device 104 renders the virtual objects 210 in the device environment previously captured. For example, the mobile computing device 104 may determine a viewing frustum based on the position and/or orientation of the mobile computing device 104 and/or the display 150 in physical space. The mobile computing device 104 may analyze the position of the virtual objects 210 to determine if any part of a virtual object 210 lies within the viewing frustum. If so, the mobile computing device 104 may visually render the virtual object(s) 210 into the captured device environment for display on the display 150. In those embodiments, the display 150 of the mobile computing device 104 appears to be a "window" through which virtual objects 210 are visible within the environment. Additionally or alternative, the mobile computing device 104 may render the virtual object 210 using other rendering modes. For example, the mobile computing device 104 may render audio for the virtual object 210 using the audio device 152 such that the audio appears to originate at the position of the virtual object 210.

In block 314, the mobile computing device 104 updates the state of one or more virtual objects 210 (e.g., the salamander is now basking). The mobile computing device 104 may update the virtual object 210 state by updating one or more attributes associated with the virtual object 210 based on the position of the virtual object 210, on a user interface command, or on any other input source. In some embodiments, in block 316 the mobile computing device 104 may transfer the virtual object 210 to the content consumption device 102. For example, the mobile computing device 104 may transfer the virtual object 210 to the content consumption device 102 when the virtual location of the virtual object 210 is nearby the content consumption device 102. In that example, the virtual object 210 may move in virtual space near the display 130 of the content consumption device 102, and then be transferred to the content consumption device 102. As another example, the mobile computing device 104 may transfer the virtual object 210 in response to a captured user interface command In that example, the user may perform a touch gesture to "flick" the virtual object 210 in the direction of the content consumption device 102, which the mobile computing device 104 may interpret as a user interface command to transfer the virtual object 210 to the content consumption device 102. Continuing the virtual pet example, the user may execute a gesture command directing the virtual salamander to crawl toward the display 130 of the content consumption device 102. When the virtual salamander appears to reach the display 130, the virtual salamander may be transferred to the content consumption device 102.

To perform the transfer of the virtual object 210, the mobile computing device 104 may transmit virtual object 210 identification data and attributes associated with the virtual object 210 to the content consumption device 102. After transmitting the virtual object 210, the mobile computing device 104 may update the virtual objects 210, including the virtual characters 212 and/or the virtual objects 214, to indicate that the virtual object 210 has been transferred to another device or delete the virtual object 210 altogether.

In some embodiments, in block 318 the mobile computing device 104 may receive a virtual object 210 from the content consumption device 102. The mobile computing device 104 may receive the virtual object 210 using the communication circuitry 148. As described below, the virtual object 210 may be received from the content consumption device 102 in response to a user interface command captured by the content consumption device 102, or when the virtual object 210 has left the virtual space associated with the content consumption device 102. Further continuing the virtual pet example, the mobile computing device 104 may receive the virtual salamander when the virtual salamander appears to crawl out of the display 130 back into the device environment of the mobile computing device 104. To receive the virtual object 210, the mobile computing device 104 may receive virtual object 210 identification data and attributes associated with the virtual object 210 from the content consumption device 102. In some embodiments, the virtual object 210 may have previously been transferred from the mobile computing device 104 to the content consumption device 102. In those embodiments, the attributes of the received virtual object 210 may be different from when first transferred to the content consumption device 102. After receiving the virtual object 210, the mobile computing device 104 may update the virtual characters 212 and/or the virtual objects 214 to indicate that the virtual object 210 has been received from the content consumption device 102. After updating the state of the virtual objects 210, the method 300 loops back to block 306 to continue augmented reality rendering.

Figure 4:
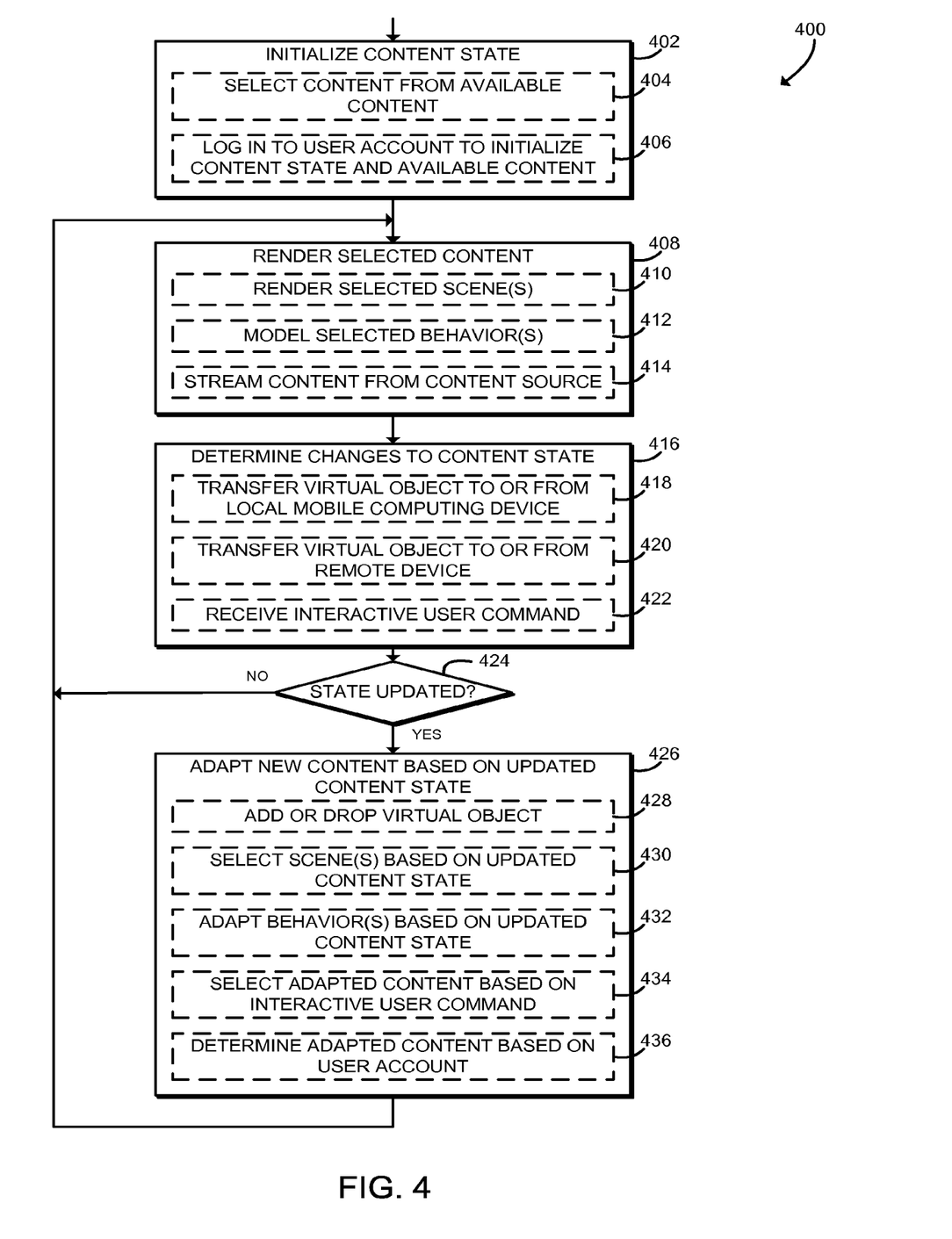
FIG. 4 is a simplified flow diagram of at least one embodiment of a method for adapting content to augmented reality virtual objects that may be executed by a content consumption device of the system of FIGS. 1 and 2.

Referring now to FIG. 4, in use, the content consumption device 102 may execute a method 400 for adapting content to augmented reality virtual objects. The method 400 begins with block 402, in which the content consumption device 102 initializes the content state. As part of initializing the content state, the content consumption device 102 may initialize the virtual objects 230 or interactions 236, for example by starting with pre-defined set of data or reloading data from an earlier session. In some embodiments, in block 404 the content consumption device 102 may select content 108 for presentation to the user. For example, the content consumption device 102 may select a particular television program, movie, video game, advertisement, or other content stored within the content 108 for presentation to the user. The content consumption device 102 may query, open a connection with, or otherwise contact the content source 106 to select the content 108.

In some embodiments, in block 406 the content consumption device 102 may log in to a user account to initialize the content state. To log in to the user account, the content consumption device 102 may authenticate the user of the content consumption device 102 locally, or may contact the content source 106 to authenticate the user and thereby log in to the user account. Logging in to the user account may allow the content consumption device 102 to access particular content 108 and/or behavior rules 240 that have been associated with the user account (e.g., behavior rules that have been previously defined, purchased, or unlocked by the user). Additionally or alternatively, the content consumption device 102 may log in to the user account to access virtual characters 232, virtual objects 234, or interactions 236 that have previously been associated with that user account, as well as any attributes that have been associated with that user account. For example, the user account may record virtual characters 232, virtual objects 234, and attributes that have been previously purchased or unlocked by the user.

In block 408, the content consumption device 102 renders the selected content 108. The content consumption device 102 may render the content by displaying video, text, rendered computer graphics, or other visual information on the display 130, by rendering audio output using the audio device 132, projecting content into the device environment, or by otherwise presenting the content 108 in a format usable by the user. In some embodiments, the content consumption device 102 may record the rendered content 108 for future playback. The rendered content 108 may include representations of the current content state, including the virtual objects 230 or the interactions 236 that have been determined based on virtual objects 230 received from the mobile computing device 104. In some embodiments, in block 410 the content consumption device 102 may render the content 108 by rendering scenes selected from a number of pre-defined scenes of the content 108. The scenes may include any form of pre-rendered or scripted content, such as video files, audio files, dialog, or scripted animations. Additionally or alternatively, in some embodiments in block 412 the content consumption device 102 may model selected behaviors of the virtual objects 230. For example, the content consumption device 102 may simulate the behavior of virtual characters 232 and/or virtual objects 234 using a physics engine, or by modeling the interaction of the virtual objects 230 based on their attributes. In some embodiments, the content consumption device 102 may select or combine certain pre-defined or scripted actions for the virtual objects 230 based on the current content state. Thus, rendering the content 108 based on the current content state may generate novel, unexpected, or emergent behaviors. In some embodiments, in block 414 the content consumption device 102 may stream the selected content 108 from the content source 106.

In block 416, the content consumption device 102 determines changes to the current content state. Changes to the content state may include changes to the virtual objects 230 or the interactions 236 maintained by the content consumption device 102. In some embodiments, in block 418 the content consumption device 102 may transfer a virtual object 230 to or from the local mobile computing device 104. For example, the content consumption device 102 may receive a nearby virtual object 230 from a local mobile computing device 104. In that example, the content consumption device 102 may receive a virtual object 230 from the mobile computing device 104 when the virtual object 230 has a position that is nearby, proximal, or otherwise associated with the content consumption device 102. Continuing that example, the virtual object 230 may be nearby the content consumption device 102 when its position coincides with the position of the display 130 or a viewing frustum of the display 130. In other words, the virtual object 230 may be nearby the content consumption device 102 when the virtual object 230 appears to be within the display 130. Additionally or alternatively, the virtual object 230 may be nearby the content consumption device 102 when the position of the virtual object 230 is within a threshold distance of the content consumption device 102, for example one meter. As an example, consider a virtual character 232 such as a monster. The monster may virtually move toward the display 130 in response to a user command or based on its modeled behavior. When the monster appears to be standing next to the display 130 or stepping into the display 130, the monster may be transferred to the content consumption device 102.

To transfer the virtual object 230, the content consumption device 102 may receive a virtual object 230 identifier, object attributes, or other information describing the virtual object 230 from a remote device using the communication circuitry 128. The content consumption device 102 may contact the local mobile computing device 104 using short-range communications capability of the communication circuitry 128 such as a Wi-Fi® or Bluetooth® radio connection. Similarly, the virtual object 230 may be transferred to the mobile computing device 104 when the virtual location of the virtual object 230 leaves the proximity of the content consumption device 102.

In some embodiments, in block 420 the content consumption device 102 may transfer a virtual object 230 to or from a remote computing device over the network 110. The virtual object 230 may be transferred using any available communication technique, including a direct network connection, email, text message, or other information transfer. That remote computing device may be embodied as a mobile computing device 104, a content consumption device 102, or any other compatible computing device. The remote device may transfer the virtual object 230 while rendering the same content 108 as the content consumption device 102. Thus, a virtual object 230 generated or used by a remote user may be transferred to the content consumption device 102, allowing geographically distributed users to interact with each other and with the content 108.

In some embodiments, in block 422 the content consumption device 102 may receive an interactive user command to change the content state. For example, the user may command the content consumption device 102 to add or remove a virtual object 230, for a virtual object 230 to initiate a selected action, or to transfer a virtual object 230 to or from the mobile computing device 104. In some embodiments, the user may control a virtual object 230 previously transferred from the mobile computing device 104. In some embodiments, the user may direct a pre-defined virtual object 230 associated with the content 108 to be transferred to the mobile computing device 104. The user command may be generated using any available input modality, such as a graphical user interface, voice commands, motion gestures, or a dedicated remote control unit.

In block 424, the content consumption device 102 determines whether the content state has been updated. For example, the content consumption device 102 may determine if any changes have been recorded in the virtual characters 232, virtual objects 234, and/or the interactions 236. If the content state is unchanged, the method 400 loops back to block 408 to continue rendering the content 108. If the content state has been changed, the method 400 advances to block 426.

In block 426, the content consumption device 102 adapts the content 108 based on the updated content state. The content consumption device 102 may adapt the content 108 by applying the behavior rules 240 to any combination of the virtual characters 232, virtual objects 234, and/or the interactions 236 recorded in the content state. In some embodiments, in block 428 the content consumption device 102 may incorporate or drop virtual objects 230 such as virtual characters(s) 232 and/or virtual object(s) 234 from the content 108. For example, the content consumption device 102 may select content 108 that includes or references a virtual object 230 that has been transferred from the mobile computing device 104.

In some embodiments, in block 430 the content consumption device 102 may select new scenes from the content 108 based on the updated content state. In those examples, the content 108 may include numerous versions of each scene, for example including different content and/or outcomes based on the content state. The content consumption device 102 may select scenes from the content 108 that incorporate the current virtual characters 232, virtual objects 234, and/or interactions 236. The behavior rules 240 may be embodied as a decision tree or other structure to allow selection of scenes based on the current virtual characters 232, virtual objects 234, and/or interactions 236.

In some embodiments, in block 432 the content consumption device 102 may adapt the behavior of virtual objects 230 based on the updated content state. For example, in some embodiments, the content consumption device 102 may update attributes of the virtual characters 232 and/or virtual objects 234, which may affect the modeled behavior of those virtual characters 232 and/or virtual objects 234. In those examples, the behavior rules 240 may determine the updated attributes of the virtual characters 232 and/or virtual objects 234. As another example, the virtual characters 232 and/or virtual objects 234 may react to a virtual object 230 introduced by the user into the content 108 by performing predetermined actions. As another example, certain of the virtual characters 232 and/or virtual objects 234 may react to an action of a virtual character 232 that was initiated by user input. In that example, the reaction of the virtual characters 232 and/or the virtual objects 234 may depend on historical interactions of the user recorded in the interactions 236. Continuing the monster example described above, assume that a number of virtual characters 232 are being rendered in the content 108. When the virtual monster is transferred to the content consumption device 102 while standing next to the display 130, the pre-existing virtual characters 232 may notice the virtual monster, for example by generating appropriate dialog and/or looking toward the virtual monster. When the virtual monster appears to enter the display 130, those pre-existing virtual characters 232 may scatter and flee. However, if the interactions 236 establish that the virtual monster has performed helpful actions in the past, the pre-existing virtual characters 232 may instead greet the virtual monster.

In block 434 in some embodiments, the content consumption device 102 may select adapted content 108 based on an interactive user command. For example, the content consumption device 102 may directly select certain scenes and/or actions based on a user choice. The behavior rules 240 may determine the available content 108 for the interactive user command.

In some embodiments, in block 436 the content consumption device 102 may adapt the content 108 based on the current user account. For example, the content consumption device 102 may select from a subset of the content 108 that has been associated with the current user account, or the content consumption device 102 may apply a subset of the behavior rules 240 associated with the current user account. The content 108 and/or behavior rules 240 may be associated with the user account through purchase, or through previous interactions with the content 108. For example, a basic set of content 108 and/or behavior rules 240 may be available to all users for free, and more complicated content 108 and/or behavior rules 240 may be available for purchase. As another example, the user may unlock new content 108 and/or behavior rules 240 by progressing through certain scenes of the content 108. After adapting the content 108 based on the current content state, the method 400 loops back to block 408 to render the newly selected content 108.

EXAMPLES

Illustrative examples of the technologies disclosed herein are provided below. An embodiment of the technologies may include any one or more, and any combination of, the examples described below.

Example 1 includes a content consumption device for adapting content to virtual objects, the content consumption device comprising: a content rendering module to render content to be presented to a user of the content consumption device; an augmented reality controller to (i) transfer a virtual object to or from a mobile computing device and (ii) update a content state associated with the content based on the transferred virtual object; and a content determination module to adapt the content based on the updated content state; wherein the content rendering module is further to render the adapted content.

Example 2 includes the subject matter of Example 1, and wherein to render the content comprises to receive the content from a content source; and to render the adapted content comprises to receive the adapted content from the content source.

Example 3 includes the subject matter of any of Examples 1 and 2, and wherein transfer the virtual object comprises to receive the virtual object from the mobile computing device.

Example 4 includes the subject matter of any of Examples 1-3, and wherein to transfer the virtual object comprises to transmit the virtual object to the mobile computing device.

Example 5 includes the subject matter of any of Examples 1-4, and wherein the augmented reality controller is further to receive an interactive user command; wherein to transfer the virtual object comprises to transfer the virtual object in response to the interactive user command.

Example 6 includes the subject matter of any of Examples 1-5, and wherein the interactive user command comprises a voice command, a gesture, a touch input, or a movement of the content consumption device.

Example 7 includes the subject matter of any of Examples 1-6, and wherein the virtual object comprises a virtual character.

Example 8 includes the subject matter of any of Examples 1-7, and wherein to transfer the virtual object comprises to transfer character attributes associated with the virtual character.

Example 9 includes the subject matter of any of Examples 1-8, and wherein to transfer the virtual object comprises to transfer the virtual object to or from the mobile computing device via a wide-area network.

Example 10 includes the subject matter of any of Examples 1-9, and wherein to transfer the virtual object comprises to determine a position of the virtual object in the physical environment of the content consumption device; determine whether the virtual position of the virtual object has a predefined relationship to a threshold distance from the content consumption device in the physical environment; and transfer the virtual object in response to a determination that the virtual position has the predefined relationship to the threshold distance.

Example 11 includes the subject matter of any of Examples 1-10, and wherein to determine whether the position of the virtual object has the predefined relationship to the threshold distance comprises to determine whether the position is within the threshold distance; and to transfer the virtual object comprises to receive the virtual object from the mobile computing device.

Example 12 includes the subject matter of any of Examples 1-11, and wherein to determine whether the position of the virtual object has the predefined relationship to the threshold distance comprises to determine whether the position is outside the threshold distance; and to transfer the virtual object comprises to transmit the virtual object to the mobile computing device.

Example 13 includes the subject matter of any of Examples 1-12, and wherein to update the content state comprises to record a user interaction.

Example 14 includes the subject matter of any of Examples 1-13, and wherein to adapt the content comprises to select a content scene from a plurality of pre-defined content scenes based on the content state.

Example 15 includes the subject matter of any of Examples 1-14, and wherein to adapt the content comprises to generate a new content scene that includes the virtual object.

Example 16 includes the subject matter of any of Examples 1-15, and wherein to adapt the content comprises to add the virtual object to the content; and to render the adapted content comprises to render the virtual object in association with the content.

Example 17 includes the subject matter of any of Examples 1-16, and wherein to adapt the content comprises to remove the virtual object from the content; and to render the adapted content comprises to render the content without the virtual object.

Example 18 includes the subject matter of any of Examples 1-17, and wherein to render the content comprises to render a content character having character attributes; and to adapt the adapted comprises to change the character attributes of the content character based on the updated content state.

Example 19 includes the subject matter of any of Examples 1-18, and wherein to change the character attributes comprises to adapt a behavior of the content character in response to the updated content state.

Example 20 includes the subject matter of any of Examples 1-19, and wherein to render the content comprises rendering a content character; and to adapt the content comprises to determine an action of the content character based on the updated content state.

Example 21 includes the subject matter of any of Examples 1-20, and further comprising a user account module to authenticate a user account with a content source; wherein to adapt the content comprises to adapt the content based on the authenticated user account.

Example 22 includes a mobile computing device for augmented reality, the mobile computing device comprising: an augmented reality rendering module to render a virtual object having first attributes within an environment of the mobile computing device; and an augmented reality controller to transmit the virtual object to a content consumption device, wherein the virtual object is not rendered within the environment of the mobile computing device in response to transmitting the virtual object to the content consumption device; and receive the virtual object having second attributes from the content consumption device, wherein the second attributes are different from the first attributes; wherein the augmented reality rendering module is further to render the virtual object having the second attributes within the environment of the mobile computing device in response to receiving the virtual object from the content consumption device.

Example 23 includes the subject matter of Example 22, and wherein the virtual object comprises a virtual character; the first attributes comprise first character attributes; and the second attributes comprise second character attributes.

Example 24 includes the subject matter of any of Examples 22 and 23, and wherein the augmented reality controller is further configured to authenticate a user account with a content source, and initialize the virtual object based on the authenticated user account.

Example 25 includes a method for adapting content to virtual objects, the method comprising: rendering, by a content consumption device, content to be presented to a user of the content consumption device; transferring, by the content consumption device, a virtual object to or from a mobile computing device; updating, by the content consumption device, a content state associated with the content based on the transferred virtual object; adapting, by the content consumption device, the content based on the updated content state; and rendering, by the content consumption device, the adapted content.

Example 26 includes the subject matter of Example 25, and wherein rendering the content comprises receiving the content from a content source; and rendering the adapted content comprises receiving the adapted content from the content source.

Example 27 includes the subject matter of any of Examples 25 and 26, and wherein transferring the virtual object comprises receiving the virtual object from the mobile computing device.

Example 28 includes the subject matter of any of Examples 25-27, and wherein transferring the virtual object comprises transmitting the virtual object to the mobile computing device.

Example 29 includes the subject matter of any of Examples 25-28, and further comprising receiving, by the content consumption device, an interactive user command; wherein transferring the virtual object comprises transferring the virtual object in response to the interactive user command.

Example 30 includes the subject matter of any of Examples 25-29, and wherein receiving the interactive user command comprises receiving a voice command, a gesture, a touch input, or a movement of the content consumption device.

Example 31 includes the subject matter of any of Examples 25-30, and wherein transferring the virtual object comprises transferring a virtual character.

Example 32 includes the subject matter of any of Examples 25-31, and wherein transferring the virtual character comprises transferring character attributes associated with the virtual character.

Example 33 includes the subject matter of any of Examples 25-32, and wherein transferring the virtual object comprises transferring the virtual object to or from the mobile computing device via a wide-area network Example 34 includes the subject matter of any of Examples 25-33, and wherein transferring the virtual object comprises determining a position of the virtual object in the physical environment of the content consumption device; determining whether the virtual position of the virtual object has a predefined relationship to a threshold distance from the content consumption device in the physical environment; and transferring the virtual object in response to determining the virtual position has the predefined relationship to the threshold distance.

Example 35 includes the subject matter of any of Examples 25-34, and wherein determining whether the position of the virtual object has the predefined relationship to the threshold distance comprises determining whether the position is within the threshold distance; and transferring the virtual object comprises receiving the virtual object from the mobile computing device.

Example 36 includes the subject matter of any of Examples 25-35, and wherein determining whether the position of the virtual object has the predefined relationship to the threshold distance comprises determining whether the position is outside the threshold distance; and transferring the virtual object comprises transmitting the virtual object to the mobile computing device.

Example 37 includes the subject matter of any of Examples 25-36, and wherein updating the content state comprises recording a user interaction.

Example 38 includes the subject matter of any of Examples 25-37, and wherein adapting the content comprises selecting a content scene from a plurality of predefined content scenes based on the content state.

Example 39 includes the subject matter of any of Examples 25-38 and wherein adapting the content comprises generating a new content scene that includes the virtual object.

Example 40 includes the subject matter of any of Examples 25-39, and wherein adapting the content comprises adding the virtual object to the content; and rendering the adapted content comprises rendering the virtual object in association with the content.

Example 41 includes the subject matter of any of Examples 25-40, and wherein adapting the content comprises removing the virtual object from the content; and rendering the adapted content comprises rendering the content without the virtual object.

Example 42 includes the subject matter of any of Examples 25-41, and wherein rendering the content comprises rendering a content character having character attributes; and adapting the content comprises changing the character attributes of the content character based on the updated content state.

Example 43 includes the subject matter of any of Examples 25-42, and wherein changing the character attributes comprises adapting a behavior of the content character in response to the updated content state.

Example 44 includes the subject matter of any of Examples 25-43, and wherein rendering the content comprises rendering a content character; and adapting the content comprises determining an action of the content character based on the updated content state.

Example 45 includes the subject matter of any of Examples 25-44, and further comprising authenticating, by the content consumption device, a user account with a content source, wherein adapting the content comprises adapting the content based on the authenticated user account.

Example 46 includes a method for augmented reality, the method comprising: rendering, by a mobile computing device, a virtual object having first attributes within an environment of the mobile computing device; transmitting, by the mobile computing device, the virtual object to a content consumption device, wherein the virtual object is not rendered within the environment of the mobile computing device in response to transmitting the virtual object to the content consumption device; receiving, by the mobile computing device, the virtual object having second attributes from the content consumption device, wherein the second attributes are different from the first attributes; and rendering, by the mobile computing device, the virtual object having the second attributes within the environment of the mobile computing device in response to receiving the virtual object from the content consumption device.

Example 47 includes the subject matter of Example 46, and wherein rendering the virtual object comprises rendering a virtual character having first character attributes; transmitting the virtual object comprises transmitting the virtual character; receiving the virtual object comprises receiving the virtual character having second character attributes; and rendering the virtual object comprises rendering the virtual character having the second character attributes.

Example 48 includes the subject matter of any of Examples 46 and 47, and further comprising authenticating, by the mobile computing device, a user account with a content source, and initializing, by the mobile computing device, the virtual object based on the authenticated user account.

Example 49 includes a computing device comprising: a processor; and a memory having stored therein a plurality of instructions that when executed by the processor cause the computing device to perform the method of any of Examples 25-48.

Example 50 includes one or more machine-readable storage media comprising a plurality of instructions stored thereon that in response to being executed result in a computing device performing the method of any of Examples 25-48.

Example 51 includes a computing device comprising means for performing the method of any of Examples 25-48.

The invention claimed is:

1. A mobile computer device for augmented reality, the mobile computer device comprising:
   a camera;
   an augmented reality rendering module to render a virtual object having first attributes within an environment of the mobile computer device; and
   an augmented reality controller to:
   determine, with the camera, that a gesture command indicates that the virtual object is to move in a direction of a content consumption device;
   transmit, in response to the determination that the gesture command indicates that the virtual object is to move in a direction of the content consumption device and in response to a determination that a position of the virtual object in a virtual space is within a viewing frustum of the content consumption device, the virtual object to the content consumption device, wherein the virtual object is not rendered within the environment of the mobile computer device in response to transmitting the virtual object to the content consumption device; and
   receive the virtual object having second attributes from the content consumption device, wherein the second attributes are different from the first attributes;
   wherein the augmented reality rendering module is further to render the virtual object having the second attributes within the environment of the mobile computer device in response to receiving the virtual object from the content consumption device.

2. The mobile computer device of claim 1, wherein:
   the virtual object comprises a virtual character;
   the first attributes comprise first character attributes; and
   the second attributes comprise second character attributes.

3. The mobile computer device of claim 1, wherein the augmented reality controller is further configured to authenticate a user account with a content source, and initialize the virtual object based on the authenticated user account.

4. The mobile computer device of claim 1, wherein the augmented reality rendering module is further to capture video of the environment of the mobile computer device.

5. The mobile computer device of claim 4, wherein the augmented reality rendering module is further to render the virtual object as an animated overlay on the captured video of the environment.

6. The mobile computer device of claim 1, wherein to render the virtual object comprises to:
determine a view frustum as a function of a position or orientation of the mobile computer device;
determine a virtual position of the virtual object in the virtual space;
translate the virtual position of the virtual object to a physical position in a physical space representative of the environment of the mobile computer device;
determine whether the physical position of the virtual object lies within the view frustum; and
render, in response to a determination that the physical position of the virtual object lies within the view frustum, the virtual object.

7. The mobile computer device of claim 1, wherein the augmented reality rendering module is further to:
determine coordinates of the virtual object in the virtual space;
translate the coordinates to a physical position in the environment of the mobile computer device; and
model a motion of the virtual object in the environment with a physics engine.

8. A mobile computer device comprising:
a processor;
a camera;
one or more memory devices having stored therein a plurality of instructions that, when executed, cause the mobile computer device to:
render a virtual object having first attributes within an environment of the mobile computer device;
determine, with the camera, that a gesture command indicates that the virtual object is to move in a direction of a content consumption device;
transmit, in response to the determination that the gesture command indicates that the virtual object is to move in a direction of the content consumption device and in response to a determination that a position of the virtual object in a virtual space is within a viewing frustum of the content consumption device, the virtual object to the content consumption device, wherein the virtual object is not rendered within the environment of the mobile computer device in response to transmitting the virtual object to the content consumption device;
receive the virtual object having second attributes from the content consumption device, wherein the second attributes are different from the first attributes; and
render the virtual object having the second attributes within the environment of the mobile computer device in response to receiving the virtual object from the content consumption device.

9. The mobile computer device of claim 8, wherein the virtual object comprises a virtual character, the first attributes comprise first character attributes, and the second attributes comprise second character attributes.

10. The mobile computer device of claim 8, wherein the plurality of instructions, when executed, further cause the mobile computer device to authenticate a user account with a content source, and initialize the virtual object based on the authenticated user account.

11. The mobile computer device of claim 8, wherein the plurality of instructions, when executed, further cause the mobile computer device to capture video of the environment of the mobile computer device.

12. The mobile computer device of claim 11, wherein the plurality of instructions, when executed, further cause the mobile computer device to render the virtual object as an animated overlay on the captured video of the environment.

13. The mobile computer device of claim 8, wherein to render the virtual object comprises to:
determine a view frustum as a function of a position or orientation of the mobile computer device;
determine a virtual position of the virtual object in the virtual space;
translate the virtual position of the virtual object to a physical position in a physical space representative of the environment of the mobile computer device;
determine whether the physical position of the virtual object lies within the view frustum; and
render, in response to a determination that the physical position of the virtual object lies within the view frustum, the virtual object.

14. The mobile computer device of claim 8, wherein the plurality of instructions, when executed, further cause the mobile computer device to:
determine coordinates of the virtual object in the virtual space;
translate the coordinates to a physical position in the environment of the mobile computer device; and
model a motion of the virtual object in the environment with a physics engine.

15. One or more non-transitory machine-readable storage media comprising a plurality of instructions that, when executed, cause a mobile computer device to:
render a virtual object having first attributes within an environment of the mobile computer device;
determine, with a camera, that a gesture command indicates that the virtual object is to move in a direction of a content consumption device;
transmit, in response to the determination that the gesture command indicates that the virtual object is to move in a direction of the content consumption device and in response to a determination that a position of the virtual object in a virtual space is within a viewing frustum of the content consumption device, the virtual object to the content consumption device, wherein the virtual object is not rendered within the environment of the mobile computer device in response to transmitting the virtual object to the content consumption device;
receive the virtual object having second attributes from the content consumption device, wherein the second attributes are different from the first attributes; and
render the virtual object having the second attributes within the environment of the mobile computer device in response to receiving the virtual object from the content consumption device.

16. The one or more non-transitory machine-readable storage media of claim 15, wherein the virtual object comprises a virtual character, the first attributes comprise first character attributes, and the second attributes comprise second character attributes.

17. The one or more non-transitory machine-readable storage media of claim 15, wherein the plurality of instructions, when executed, further cause the mobile computer device to authenticate a user account with a content source, and initialize the virtual object based on the authenticated user account.

18. The one or more non-transitory machine-readable storage media of claim 15, wherein the plurality of instructions, when executed, further cause the mobile computer device to capture video of the environment of the mobile computer device.

19. The one or more non-transitory machine-readable storage media of claim 18, wherein the plurality of instructions, when executed, further cause the mobile computer device to render the virtual object as an animated overlay on the captured video of the environment.

20. The one or more non-transitory machine-readable storage media of claim 15, wherein to render the virtual object comprises to:
  determine a view frustum as a function of a position or orientation of the mobile computer device;
  determine a virtual position of the virtual object in the virtual space;
  translate the virtual position of the virtual object to a physical position in a physical space representative of the environment of the mobile computer device;
  determine whether the physical position of the virtual object lies within the view frustum; and
  render, in response to a determination that the physical position of the virtual object lies within the view frustum, the virtual object.

21. The one or more non-transitory machine-readable storage media of claim 15, wherein the plurality of instructions, when executed, further cause the mobile computer device to:
  determine coordinates of the virtual object in the virtual space;
  translate the coordinates to a physical position in the environment of the mobile computer device; and
  model a motion of the virtual object in the environment with a physics engine.

22. A method comprising:
  rendering, by a mobile computer device, a virtual object having first attributes within an environment of the mobile computer device;
  determining, by the mobile computer device and with a camera, that a gesture command indicates that the virtual object is to move in a direction of a content consumption device;
  transmitting, by the mobile computer device, in response to the determination that the gesture command indicates that the virtual object is to move in a direction of the content consumption device and in response to a determination that a position of the virtual object in a virtual space is within a viewing frustum of the content consumption device, the virtual object to the content consumption device, wherein the virtual object is not rendered within the environment of the mobile computer device in response to transmitting the virtual object to the content consumption device;
  receiving, by the mobile computer device, the virtual object having second attributes from the content consumption device, wherein the second attributes are different from the first attributes; and
  rendering, by the mobile computer device, the virtual object having the second attributes within the environment of the mobile computer device in response to receiving the virtual object from the content consumption device.

* * * * *